United States Patent [19]

Scherzer et al.

[11] 4,332,782

[45] Jun. 1, 1982

[54] METHOD OF PRODUCING PSEUDOBOEHMITE

[75] Inventors: Julius Scherzer, Anaheim; Anh-Thu Liu, Santa Ana, both of Calif.

[73] Assignee: Filtrol Corporation, Los Angeles, Calif.

[21] Appl. No.: 173,064

[22] Filed: Jul. 28, 1980

[51] Int. Cl.³ .............................................. C01F 7/34
[52] U.S. Cl. .................................... 423/628; 423/631; 423/625
[58] Field of Search ............... 423/625, 628, 631, 629; 252/317

[56] References Cited

U.S. PATENT DOCUMENTS

| | | | |
|---|---|---|---|
| 2,838,444 | 6/1958 | Teter et al. | 423/628 |
| 2,894,915 | 7/1959 | Keith | 423/631 |
| 2,913,400 | 11/1959 | Burton et al. | 423/631 |
| 3,151,939 | 10/1964 | Kehl et al. | 423/631 |
| 3,188,174 | 6/1965 | Kehl et al. | 423/631 |
| 3,379,499 | 4/1968 | Moehl | 423/628 |
| 3,380,933 | 4/1968 | Michel et al. | 423/628 |
| 3,864,461 | 2/1975 | Miller et al. | 423/628 |
| 3,966,893 | 6/1976 | Derolf et al. | 423/631 |
| 4,010,116 | 3/1977 | Secor et al. | 252/455 Z |
| 4,086,187 | 4/1978 | Lim et al. | 252/455 Z |
| 4,120,943 | 10/1978 | Iwaisako et al. | 423/628 |
| 4,157,382 | 4/1979 | Goodboy et al. | 423/628 |
| 4,206,085 | 6/1980 | Lim et al. | 252/455 Z |

FOREIGN PATENT DOCUMENTS

| | | | |
|---|---|---|---|
| 888772 | 2/1962 | United Kingdom | 423/628 |
| 967902 | 8/1964 | United Kingdom | 423/628 |

*Primary Examiner*—Herbert T. Carter
*Attorney, Agent, or Firm*—Paul E. Calrow; Andrew E. Barlay; Philip Subkow

[57] ABSTRACT

A pseudoboehmite having properties suitable for incorporation into a matrix for a zeolite containing catalyst and the process for producing the same from an aluminum sulfate derived gel.

5 Claims, No Drawings

METHOD OF PRODUCING PSEUDOBOEHMITE

BACKGROUND OF THE INVENTION

The art of hydrocarbon conversion, such as the cracking of petroleum fractions employing catalysts in fluid processes, is well established. The more recent types of catalyst for such purpose have been the crystalline alumino silicate catalysts. One widely used form of such catalysts is the microspheres produced by spray drying a slurry containing a zeolite, clay and alumina. They have been formulated by spray drying a slurry containing particles of the catalyst combined with a matrix comprising alumina hydrates. (See Secor U.S. Pat. No. 3,445,727 and art cited therein.) Examples of such catalysts are those formulated by spray drying a slurry containing a zeolite of the faujasite type, preferably a Y zeolite. (See Breck U.S. Pat. No. 3,130,007), which has been exchanged with monovalent cations, for example, $NH_4$ or polyvalent cations such as rare earth cations to reduce the sodium content in the range of about 1% to about 4%. For example, such zeolites are combined in a water slurry with a kaolin clay and with hydrated alumina.

It has been shown in the prior art that pseudoboehmite is a desirable form of hydrated alumina for use in the matrix for the zeolite Y containing hydrocarbon conversion catalyst to produce a catalyst of suitable attrition resistance and catalytic activity for use in fluid cracking systems. The zeolite component may range from about 10% to about 50%, the alumina from about 5% to 50% and the clay from about 20% to about 85%, all on a volatile free basis. The slurry is spray dried to form particles referred to as microspheres, for example, having an average nominal diameter in the range of about 50 to about 70 microns.

Alumina hydrate may be formed from an aluminum sulfate by hydrolysis with ammonium hydroxide as is well known (see Kehl et al, U.S. Pat. No. 3,188,174) or from ammonium alum (See Secor Patent supra.)

It is recognized in this art that not all alumina hydrates including all forms of pseudoboehmites are equally useful for such purpose (see Secor, et al, U.S. Pat. No. 4,010,116, Lim et al U.S. Pat. Nos. 4,086,187, and 4,206,085.

As has been shown in the above Lim, et al, patent and Lim et al, applications, the Attrition Index of an exchanged zeolite containing kaolin clay, and a suitable form of pseudoboehmite is considerably improved, if the slurry which is spray dried to give microspheres contains some ammonium polysilicate.

In our copending application Ser. No. 06/138,544 filed Apr. 9, 1980, we have shown that the conversion of aluminum sulfate into a suitable pseudoboehmite is uniquely different from the conversion of the aluminum salt of a monovalent strong acid such as $AlCl_3$ or $Al(NO_3)_3$ in that pseudoboehmites produced by the procedure which results in a suitable pseudoboehmite from the monovalent acid salts by the procedure of that application is not suitable for the sulfate salt. See also Kehl et al U.S. Pat. No. 3,188,174 and Secor et al and Lim et al patents, supra.

As described in the above patents and patent applications, convenient tests have been developed which select pseudoboehmites suitable for incorporation in the catalysts containing exchanged Y and a matrix referred to above. The details of the test which is referred to in this specification are described in our copending application which application is incorporated in this application by this reference.

The test develops a Peptization Index (PI) as the time in minutes required for a pseudoboehmite peptized by formic acid to develop a Brookfield Viscosity of 5000 centipoises.

14.9 grams of the pseudoboehmite (on a volatile free basis) is dispersed in sufficient water to weigh 145 grams. To this water slurry is added 1.4 grams of 90% formic acid and the slurry is stirred until the vortex disappears. The slurry is then incorporated promptly into a Brookfield viscosimeter and the interval of time measured until the viscosity reaches 5000 centipoises. Time is measured from the time that the formic acid is added to the slurry.

The Peptization Index of the test alumina hydrate is the number of minutes required to reach the above viscosity. (A pseudoboehmite which fails to arrive at the above viscosity in sixty (60) minutes is unlikely to reach such viscosity at even a greatly prolonged period of time.) The alumina hydrate of our invention, which is produced by the process of our invention is characterized by a Peptization Index of sixty (60) or less than sixty (60) minutes.

The test procedure for determining the Attrition Index (AI) of spray dried microspheres of the catalyst referred to in this specification is described in the aforesaid Secor, et al U.S. Pat. No. 4,010,116.

The test procedures by which the catalytic activity of the catalyst in which the alumina produced according to our invention is described in our copending application Ser. No. 06/138,544.

The test procedure for determining the pore size distribution, pore volume and surface area of the alumina of our invention is described in the copending application incorporated herein by this reference.

STATEMENT OF THE INVENTION

A pseudoboehmite having a PI of not more than 60 minutes may be formed from aluminum sulfate by the following procedure:

1. Aluminum sulfate is reacted with ammonium hydroxide in a water solution to a terminal pH substantially in excess of 9 and preferably of about 9.5 or higher pH.

2. The precipitated alumina hydrogel is converted into the crystalline pseudoboehmite by aging for a prolonged period of time.
   (a) The pH during aging is desirably maintained above about 8.
   (b) Aging time is reduced by maintaining the pH of the mother liquor above 8 and preferably above 9 and the rate of crystallization of the gel into pseudoboehmite is materially increased by seeding the reaction mixture.

3. The crystallized pseudoboehmite is separated from the mother liquor.

4. The separated pseudoboehmite is washed to remove sulfates.

5. At least one or both of the steps 2 and 4 must be under quiescent conditions.

6. If it is to be dried, it is preferably dried under moderate drying conditions.

In this specification and claims, the term "aging" is the maintenance of the gel after it is formed in contact with the resultant mother liquor under the indicated conditions and for the time indicated during which period the gel is crystallized into its pseudoboehmite phase. The terminal pH is the pH of the mother liquor in contact with the gel and prior to the aging step.

DETAILED STATEMENT OF THE INVENTION

The development of a pseudoboehmite of suitable form for incorporation in a catalyst of the foregoing composition is largely affected by the conditions of the crystallization from the alumina gel and the drying conditions.

In producing the crystalline pseudoboehmite of our invention, we prefer to employ nearly saturated solutions of aluminum sulfate and concentrated ammonium hydroxide. The two are mixed preferably to a terminal pH of at least about 9, for example 9.5 or higher, and preferably about 9.8. The order of mixing is not material. The alumina hydrogel, thus formed preferably dispersed in the mother liquor is then aged at a pH of about 8 or higher pH in the presence of the mother liquor to convert the hydrogel into crystalline pseudoboehmite under quiescent conditions as is herein more fully described and then dried at moderate conditions of temperature and time, as is more fully hereinafter described. The dried pseudoboehmite of our invention exhibits a Peptization Index (PI) of less than 60 and preferably less than 10.

The pseudoboehmites of our invention have a pore structure characteristic of a small pore alumina as is more fully described.

The following description, together with the following examples, illustrates the preferred procedure for forming pseudoboehmite of our invention having a suitable Peptization Index and the result effective parameters of the process of converting aluminum sulfate into crystalline pseudoboehmite of our invention.

EXAMPLE 1

A saturated solution of aluminum sulfate (specific gravity at 25° C. of 1.309 grams per milliliter of solution and containing 7.7% by weight of the equivalent $Al_2O_3$) is mixed with a concentrated ammonium hydroxide solution (specific gravity at 25° C. of 0.906 grams per milliliter of solution and containing 26% by weight of the equivalent $NH_3$) were mixed simultaneously by addition of the two solutions to a vessel to produce a terminal pH of 9.8.

The mixture was stirred for a few minutes to ensure homogeniety and the mixture of the alumina hydrogel and the mother liquor allowed to age undisturbed in a container which was loosely covered, at a temperature of 65° C. for three days. The aged mixture was filtered and the filter cake washed undisturbed on the filter until the wash water was substantially free of sulfates.

The filter cake material was dried at a temperature of 102° C. for six hours while in a quiescent condition on a tray in an oven, herein referred to as tray dried. The dried solids were substantially entirely crystalline pseudoboehmite and had a Peptization Index of less than 1 minute.

EXAMPLE 2

This example illustrates the effect of stirring of the mixture during aging and prior to filtration.

The procedure of Example 1 was followed, except as follows. The terminal pH was adjusted to 10. The samples were aged in a vessel supplied with a stirrer and connected to a reflux condenser to return water vapor and $NH_3$. Six samples were prepared according to that procedure.

TABLE I

| Sample | Time | Aging Process Stirring yes | Aging Process Stirring none | Washing Process Slurrying yes | Washing Process Slurrying no | % $SO_3$ | P.I. (in minutes) |
| --- | --- | --- | --- | --- | --- | --- | --- |
| 1 | 4 days | R | | + | | 3.0 | * |
| 2 | 4 days | | No, R | | + | 3.3 | 1 |
| 3 | 4 days | R | | + | | 3.9 | * |
| 4 | 4 days | | No, R | | + | 3.6 | 1 |
| 5 | 1 day | R | | | − | 2.2 | 1 |
| 6 | 1 day | R | | + | | 3.0 | * |

In each sample, the alumina after precipitation of the gel was heated under reflux at a temperature of 65° C. for the time indicated in Table 1. The sample in Table 1 identified as aged by procedure indicated by symbol "R" were stirred during the refluxing and samples identified as "NoR" were not stirred during refluxing. The samples were then filtered and washed to reduce the sulfate content to acceptable limits, i.e., less than about 5% on a volatile free basis. The filter cake samples marked (+) were reslurried several times with deionized water and then filtered after each slurrying and the filter cakes which were undisturbed during washing are marked by (−). The $SO_3$ content of sulfate (expressed as equivalent $SO_3$ on a volatile free basis), of the filter cakes is given in Table 1. As is shown in Table 1, the degree of washing resulting in similar sulfate contents was substantially the same for all the samples. The samples were all dried at about 103° C. for about six hours. The Peptization Index in minutes of the sample pseudoboehmite after drying is given in Table 1.

The samples which were both stirred during aging (R) and reslurried for washing (+) had an unacceptable index (*) i.e., in excess of sixty (60) minutes. Those which were either not agitated during aging (NoR) or not reslurried (−) although agitated during aging (R) had acceptable indexes of under four minutes.

It appears that an excessive amount of agitation or other mechanical working of the crystallized pseudoboehmite prior to drying is disadvantageous. We prefer, therefore, when the crystallized pseudoboehmite is to be worked during washing, that the aging be under quiescent conditions. A moderate amount of disturbance of the crystals as by reslurrying is permissable, if the aging is quiescent. We, however prefer to age under quiescent conditions and to avoid excessive working of the crystallizing or crystallized pseudoboehmite prior to drying by aging under quiescent conditions, and to wash too under quiescent conditions.

As is illustrated by the data of the above Table 1, there is a trade off between the conditions during crystallization and the mechanical manipulation of the separated pseudoboehmite before drying.

In this specification and claims, the term aging or aged under quiescent conditions means maintaining the hydrogel and the crystallizing pseudoboehmite in contact with its mother liquor and during its separation from its mother liquor and prior to drying of the pseudoboehmite under conditions where it is not excessively mechanically manipulated. Such an aging procedure is herein termed quiescent aging and is illustrated by Samples 2, 4 and 5 of Table 1.

The order of mixing of the aluminium sulfate and ammonium hydroxide is not material provided the aging is under quiescent conditions as specified above.

Thus in the case of Sample 2, the aluminum sulfate and ammonium hydroxide were mixed by simultanious addition to the reaction vessel.

In Samples 3, and 4, the ammonium hydroxide solution was added to the aluminum sulfate.

In Examples 5 and 6, the aluminum sulfate was added to the ammonium hydroxide solution.

EXAMPLE 3

The rheological properties measured by the Peptization Index are improved with increase of aging time, as is illustrated by Example 3.

In this example, the alumina gel of the Samples of Table 2 was formed as in Example 1 but with reactants adjusted to a pH in the range of 9.8 to 9.9 as is indicated in Table 2 and aged in a loosely covered container for times, and dried at a temperature to produce a product of the indicated volatile content and the rheological properties of the resultant pseudoboehmite, all as stated in Table 2. The aging was under quiescent conditions including washing the undisturbed filter cake.

TABLE 2

| SAMPLE | AGING TIME[1] | DRYING TIME IN HOURS | % VM[2] | DRYING TEMP. °C. | PI IN MINUTES |
|---|---|---|---|---|---|
| 1 | 0 | 4 | 43.7 | 105 | x |
| 2 | 16 | 5 | 32.7 | 105 | x |
| 3 | 21 | 5 | 31.3 | 105 | 11 |
| 4 | 24 | 4 | 24.1 | 105 | x |
| 5 | 40 | 5 | 33.5 | 105 | 28 |
| 6 | 45 | 3.5 | 26.9 | 105 | 3 |
| 7 | 48 | 4 | 27.1 | 105 | 2 |
| 8 | 48 | 4 | 40.5 | 105 | 1 |
| 9 | 72 | 4 | 30.2 | 105 | 1 |
| 10 | 72 | 4 | 36.5 | 105 | 1 |
| 11 | 72 | 8 | 21.9 | 105 | 25 |
| 12 | 72 | 18 | 20.8 | 105 | x |
| 13 | 72 | 4 | 22.4 | 150 | x | x = No or substantially no viscosity rise after sixty (60) minutes.
[1]Time in hours prior to separation of the pseudoboehmite and after addition of reactants.
[2]Percent of volatile material in the dried product including $SO_3$, $NH_3$ and $H_2O$.

It will be observed that until about 30 hours or more hours of aging (after addition of reactants and prior to separation of the pseudoboehmite in an unseeded reaction mixture), the pseudoboehmite does not arrive at an acceptable Peptization Index. This parameter applies to unseeded reaction mixtures, in which the pH is not maintained at substantially the terminal pH. See Example 6. The effect of excessive drying temperature is seen by comparing Sample 10 and 13, of Table 2, both formed and aged in the same way. The Samples were tray dried for the same time. The product dried at the higher temperatures (see much lower % volatiles) gave a PI in excess of sixty (60) minutes while the sample 10 had a good PI value.

EXAMPLE 4

The effect of temperature of drying and the time during which the pseudoboehmite is exposed during drying is also illustrated by the results of drying the filter cake in a spray drier in which the filter cake is dispersed in a water slurry which is introduced into a stream of combustion gases to pass countercurrent to incoming slurry in a spray drier. The time interval, i.e., the residence time, in the spray drier is very short, a matter of minutes. The pseudoboehmite was formed as in Example 1 at the terminal pH and aging time as given in Table 3. The inlet gas temperature and the outlet gas temperature are given as in Table 3.

TABLE 3

| Sample | pH*** | Aging* Time | Aging* Temp | Spray Drier Gas Temperature Inlet Temp °F. | Spray Drier Gas Temperature Outlet Temp °F. | PI Minutes |
|---|---|---|---|---|---|---|
| 1 | 9.8 | 2 days | 70 | 550 | 290 | 2 |
| 2 | 9.8 | 3 days | 70 | 550 | 300 | 2 |
| 3 | 9.7 | 3 days | 80 | 800 | 400 | ** |

*Quiescent aging conditions.
**In excess of sixty (60) minutes. Required two (2) hours to reach 5000 centipoises.
***Terminal pH The slurry entering the spray drier had 10-11% solids content.

The result of excessive drying as in the previous example is also evidenced by the result at the higher spray drier temperatures.

The conditions of drying a crystallized pseudoboehmite by aging the hydrated alumina formed according to our invention whereby the time of drying and the temperatures to which the pseudoboehmite is exposed which results in a pseudoboehmite having a PI of no more than 60 minutes and preferably less than ten (10) minutes in time is termed moderate drying conditions. Example 1, 3 and 4 illustrates such moderate drying conditions. Examples 1, 3 and 4 illustrate the moderate drying temperatures which resulted in a PI of less than 60 minutes. In the case of tray drying, the temperature under 105° C. (i.e., under about 221° F. and moderately short drying times) produced low PI aluminas. In the case of the spray drier, the reduced time of exposure to high temperature permitted a higher drying temperature. Compare Samples 1 and 2 with Sample 3 of Table 3.

The term moderate drying as used in this specification and claims means drying conditions in which the wet alumina is heated, whereby pseudoboehmite of a PI not more than sixty (60) is obtained. Where the drying conditions are for long periods of time, as for example in tray drying, moderate drying conditions means such exposure to temperature in which the maximum temperature is not over 115° C. and preferably less than 110° C. Where the wet filter cake is spray dried, moderate drying means spray drying in which the outlet temperature of the gases is less than 400° F. and preferably not above about 350° F. To distinguish drying as in tray drying where the wet pseudoboehmite is not mechanically disturbed during drying, from spray drying, we refer to the former drying conditions as quiescent drying conditions.

EXAMPLE 5

While the Peptization Index in the range of 60 minutes or less will produce acceptable attrition indexes in the above catalyst systems, we prefer to employ pseudoboehmites which have Peptization Indexes (PI) under about 10.

As stated above, the production of a pseudoboehmite of suitable PI requires, in addition to all of the other success determinative parameters of aging and drying, that the alumina hydrate hydrogel be formed at a suitably high pH above about 9.5. This is illustrated in this Example 5.

The pseudoboehmites were produced as in Example 1 but the pH was adjusted to a terminal pH, as indicated in Table 4.

TABLE 4

| SAMPLE | pH* | AGING TEMP. IN °C. | AGING TIME | PI MINUTES |
|---|---|---|---|---|
| 1 | 9 | 60 | 7 days | x |
| 2 | 9 | 100 | 7 days | x |
| 3 | 9 | 70 | 2 hours | x |
| 4 | 9 | 70 | 18 hours | x |
| 5 | 9 | 65 | 4 days | x |
| 6 | 9.6 | 60 | 1 day | x |
| 7 | 9.6 | 80 | 3 days | 1 |
| 8 | 9.6 | 90 | 2 hours | x |
| 9 | 9.6 | 90 | 4 hours | x |
| 10 | 9.6 | 80 | 1 day | x |
| 11 | 10.0 | 80 | 1 day | x |
| 12 | 10.0 | 65 | 3 days | 1 |
| 13 | 10.0 | 60 | 4 days | 5 |
| 14 | 10.0 | 80 | 4 days | 4 |
| 15 | 10.0 | 65 | 1 hour | x |
| 16 | 10.0 | 65 | 2 hours | x |
| 17 | 10.0 | 65 | 4 hours | x |
| 18 | 10.0 | 65 | 1 day | 37 | x = No or substantially no viscosity increase in sixty (60) minutes
*Terminal pH Samples 1, 2, 6, 7, 11, 12, 13 and 14 were aged in a loosely covered container as in Example 1, and Samples 3, 4, 5, 8, 9, 10, 15, 16, 17 and 18 were aged under reflux as in Example 2.

The required success controlling parameters are a relatively high pH above about 9.5 and aging time in excess of thirty (30) hours as indicated above (for unseeded reactions in which the pH during aging is not maintained at about the terminal pH) to produce a pseudoboehmite of suitable PI.

In all of the previous examples the alumina hydrate gel was produced as indicated without seeding and the parameters as stated above, relates to an unseeded system.

We have found that seeding reduces the time required to develop the required Peptization Index (PI), for example to less than about 18 hours, without affecting the other reaction parameters, to wit, temperature, the effect of agitation during aging, the effect of slurrying the filter cake, and the effect of the drying conditions.

The following Example 6 illustrates the effect of seeding on the crystallization rate to produce a pseudoboehmite having a suitable Peptization Index (PI), i.e., with a PI of about sixty (60) minutes or less.

EXAMPLE 6

The process of Example 1 was followed with the following variation in pH and temperature and aging time with the results as stated in Table 5.

Five (5) liters of ammonium hydroxide containing 0.906 grams/per milliliters of solution was mixed with 25 grams (twenty (20) grams on a volatile free basis) of a Type A pseudoboehmite (See Lim et al, U.S. Pat. No. 4,206,085) and PI of twenty-four (24) as a seed (See Sample 2 of Table 6). Fifteen (15) minutes after the addition of the seed, seven (7) liters of aluminum sulfate (containing the equivalent of 1.2079 grams of $Al_2O_3$/per milliliter), was slowly added to the ammonium hydroxide while stirring. The terminal pH of the mixture was at a pH of 9.8. The mixture was heated at a temperature and time as indicated for the Sample in Table 5.

The same operation was carried out as stated above, but without the addition of the seed as indicated in Table 5.

The pH, aging time and temperature and PI are indicated in said Table 5.

TABLE 5

| Sample | pH* | Seeding | Aging Temp. | Aging Time | PI/Minutes |
|---|---|---|---|---|---|
| 1 | 9 | None | 70* | 18 hrs. | x |
| 2 | 9 | Yes | 75 | 18 hrs. | x |
| 3 | 9 | None | 60 | 7 days | x |
| 4 | 9 | Yes | 65 | 2 days | x |
| 5 | 9 | Yes | 65 | 5 days | x |
| 6 | 9.6 | None | 80 | 1 day | x |
| 7 | 9.6 | Yes | 85 | 22 hrs. | 4 |
| 8 | 10.0 | None | 65 | 1 day | 37 |
| 9 | 10.0 | Yes | 80 | 18 hrs. | 1 | x No or substantially no viscoscity increase in sixty (60) minutes.
*Terminal pH Samples 1, 2, 6, 8 and 9 under reflux with stirring, 7 under reflux without stirring Samples 3, 4 and 5 were aged in a loosely covered container Seeding did not result in a pseudoboehmite of suitable Peptization Index (PI) at 9 pH and resulted in a suitable PI at pH of 9.6 and an improved PI at 10 pH. The seeding accelerated the generation of the desired quality as can be seen by comparing Samples 6 and 7 where Sample 6 did not arrive at the desired form of the pseudoboehmite. In the case of Sample 8 and 9, as in the case of Samples 6 and 7, the aging process was accelerated in that the magnitude of the PI was materially reduced by the seeding.

The seed is added to the aluminum sulfate or to the ammonium hydroxide or the mixture thereof. The seed is a pseudoboehmite having a PI substantially less than sixty (60), for example, less than about 40. It is added in amount equivalent on a volatile free basis to about 0.05% to about 1% of the weight of $Al_2O_3$ (volatile free) which is equivalent to the weight of $Al_2(SO_4)_3$ (volatile free) in the mixture. Said added pseudoboehmite is herein referred to as "seed".

EXAMPLE 7

The pseudoboehmites formed under conditions according to the process of our invention have pores characteristic of those produced from the aluminum salts of the monobasic acids as described in our above copending application.

Thus, for example, the pseudoboehmite identified as Sample 13, Table 4, had a surface areas of 377 $m^2$/gm and pore volumes as stated in the following Table 6.

TABLE 6

| | | | PORE SIZE DISTRIBUTION | | | | | | | | | | |
|---|---|---|---|---|---|---|---|---|---|---|---|---|---|
| | | PV | VOLUME % OF PORES IN RADIUS RANGES | | | | | | | | | | |
| | SA | (cc/g.) | 10-25 | | 25-50 | | 50-100 | | 100-150 | | 150-200 | | 200-300 | |
| Sample No. | ($m^{-2}$/g) | ADS DES | ADS | DES | ADS | DES | ADS | DES | ADS | DES | ADS | DES | ADS | DES |
| 1 | 377 | 0.32 0.32 | 71.3 | 97.5 | 25.5 | 1.6 | 2.6 | 0.4 | 0.2 | 0.1 | 0.2 | 0.2 | 0.2 | 0.1 |

TABLE 6-continued

| | | PORE SIZE DISTRIBUTION | | | | | | | | | | | | |
|---|---|---|---|---|---|---|---|---|---|---|---|---|---|---|
| | SA | PV (cc/g.) | | VOLUME % OF PORES IN RADIUS RANGES | | | | | | | | | | |
| | | | | 10–25 | | 25–50 | | 50–100 | | 100–150 | | 150–200 | | 200–300 | |
| Sample No. | (m$^{-2}$/g) | ADS | DES | ADS | DES | ADS | DES | ADS | DES | ADS | DES | ADS | DES | ADS | DES |
| 2 | 308 | 0.37 | 0.37 | 53.4 | 82.4 | 38.1 | 16.1 | 7.2 | 0.9 | 0.7 | 0.3 | 0.4 | 0.2 | 0.3 | 0.2 |

Sample 1 is Sample 13 of Table 4
Sample 2 is an alumina reported to be produced by hydrolysis of aluminum alkyls which is a commercial product which has been used in the prior art as a component of such catalysts, and which has a PI of 24. It is a type A alumina. See Lim et al, Pat. No. 4,206,085
PV is pore volume in cc/gram
ADS - Pore volume % from the Adsorption Isotherm in pores in the indicated range of pore radii in Angstroms
DES - Pore Volume % from the Desorption Isotherm in pores of the indicated range of pore radii in Angstroms
For method of evaluation of pore volumes, surface areas and distribution of percent of pores of a given diameter, see our copending application, Serial No. 06/138,544, which is incorporated herein by that reference.

The pseudoboehmite of our invention is a small pore alumina having substantially all of its pores in pores of equivalent radii of less than twenty-five (25) Angstroms whether measured from the adsorption or desorption isotherm. As compared with Type A aluminas derived from the aluminum alkyls by hydrolysis (See Secor et al, patent and Lim et al patent and patent applications, supra), a substantially greater concentration of the pores of equivalent radii of less than 25 Angstroms is in the aluminas of our invention. This is illustrated in Table 6.

TABLE 7

| | | Aging | | Drying | | | Catalyst | | | |
|---|---|---|---|---|---|---|---|---|---|---|
| | | Temp. | Time | Time | | Catalyst | Activity[2] | | | |
| Sample | pH | °C. | Days | Hours | Temp. °C. | Type | Al | M | S+ | |
| 1 | 9.6 | 80 | 3 | 5 | 105 | 2 | 1 | 16 | 75 | 21.4 |
| 2 | 9.6 | 80 | 3 | 6 | 105 | 2 | 2 | 18 | 76.8 | 33.1 |
| 3 | 9.9 | 75 | 2 | 4 | 105 | 1 | 2 | 14 | 74.0 | 27.0 |
| 4 | 9.8 | 70 | 2 | (1) | (1) | 2 | 2 | 15 | 74.4 | 31.6 |

[1]The pseudoboehmite filter cake was slurried and spray dried at an inlet temperature of 550° F. and outlet temperature of 290° F. All other samples were dried under quiescent conditions.
[2]The test procedure for determination of M and S+ activity is described in application, Serial No. 06/138,544.

EXAMPLE 8

The procedure of Example 1 was followed in preparing the gel for aging. The terminal pH was 9.82. The gel and mother liquor was separated into three like samples and were all aged at 65° C. for 1 day. Sample 1 was placed in an open container. Sample 2 was aged in a loosely covered container as in the case of previous Examples. Sample 3 was heated under reflux as in the case of Example 2, but without stirring. Table 8 tabulates the results.

TABLE 8

| | pH of Mother Liquor | | | |
|---|---|---|---|---|
| Sample | Terminal pH | After Aging | % SO$_3$ | PI |
| 1 | 9.8 | 8.5 | 3.7 | * |
| 2 | 9.8 | 8.9 | 4.0 | * |
| 3 | 9.8 | 9.7 | 3.4 | 3 |

*No viscosity increase after 1 hour.

The table indicates that where the samples were aged in a loosely covered vessel, as in Example 1, considerable loss of NH$_3$ occurs with a consequent reduction in pH. The 1 day period was insufficient to form a pseudoboehmite of a PI of at least 60.

Sample 3 whose pH was maintained substantially constant produced a pseudoboehmite of good Peptization Index.

EXAMPLE 9

The samples of Table 7 were formed as described in Example 1 to the terminal pH as indicated in the table and aged in a loosely covered container at the temperature and for the time indicated in the table under quiescent conditions.

The Type 1 catalyst was formulated by spray drying a thoroughly mixed slurry containing 30% solids formed of 18% of an ammonium and rare earth cation exchanged Y zeolite of about 4.8 SiO$_2$/Al$_2$O$_3$ ratio, containing sodium, about 4.5% expressed as equivalent Na$_2$O based on the zeolite, 16% pseudoboehmite of our invention (expressed as the equivalent Al$_2$O$_3$) and the rest kaolin clay, all percentages on a volatile free basis.

Type 2 catalyst employed a mixture of two types of Y zeolite of SiO$_2$/Al$_2$O$_3$ molar ratio is about 4.7 were incorporated with the matrix as described below.

One was ammonium and rare earth exchanged to reduce the sodium content of the zeolite to about 2% by weight of the zeolite expressed as the equivalent Na$_2$O on a volatile free basis, 11% by weight of this zeolite based on the composite catalyst on a volatile free basis was employed.

In addition there was added to the matrix an exchanged zeolite as used in the Type 1 catalyst, 7% by weight of this zeolite based on the composite catalyst on a volatile free basis was employed.

The composite catalyst contained 63.5% ball clay and 2.5% of ammonium polysilicate (expressed as the equivalent SiO$_2$). (See Lim et al U.S. Pat. No. 4,086,187, supra.) The catalyst contained 16% pseudoboehmite expressed as the equivalent Al$_2$O$_3$.

The pseudoboehmite prior to incorporation in both catalysts was peptized using the ratios of pseudoboehmite to formic acid as in the PI test method. (See above.)

Reference to the above examples illustrates the discovery that where the loss of NH$_3$ during aging is restrained, and where in practical effect is substantially prevented so as to maintain the pH above 8 and preferably at substantially the terminal pH, and pseudoboehmite of PI substantially less than 60, and preferably under 10 may be obtained as a result of aging. The loss of $NH_3$ during aging reduces the rate of crystallization. By preventing the loss of $NH_3$ so as to maintain the pH substantially above 8 and preferably above 9 pH the rate of crystallization permits of suitable crystallization within a practical time scale, about 1 day or 2 days as indicated above. However, where the aging proceeds with loss of $NH_3$, a suitable Peptization Index may be obtained by prolonged period of time provided the pH does not fall to an excessively low pH, preferably not less than about 8.

Reference to the above examples where the container was loosely covered as in Sample 2 of Table 8, shows that even under these conditions, the prolongation of the aging time produces a pseudoboehmite of PI substantially less than 60.

The dried pseudoboehmites produced according to our invention in which the process parameters are controlled as to pH, in the range above 9 pH and preferably above 9.5, i.e., 9.6 or higher, under quiescent aging conditions at pH about 8 and moderate drying conditions produces a pseudoboehmite crystalline phase having a PI of less than 60 and preferably less than about 10.

The aluminas of our invention are characterized as having substantially the entire pore volume (derived from the desorption isotherm) contained in pores of diameter less than about 50 Angstroms (as derived from the desorption isotherm). In the preferred embodiment of the invention, such pores constitute above about 90%, for example, in excess of 95% (See Table 6.).

The process which is our presently preferred embodiment of our invention and the best mode is a process according to the procedure of Example 6 employing seed in amount of less than 1% of the $Al_2O_3$ equivalent to the aluminum sulfate and controlling the mixture to obtain a terminal pH substantially above 9, for example, 9.5 or above. The aging is carried out for about 1 day avoiding the excessive loss of $NH_3$ to maintain the pH above 9 and preferably at substantially the terminal pH. The filter cake is washed with minimum agitation.

The filter cake may be used without drying. Where it is to be added as a wet filter cake to form part of a matrix to a catalyst such as described herein, it is preferable that it be subjected to a milling operation.

The catalyst formulation employing the wet washed pseudoboehmite combined with the clay and zeolite is subjected to a comminuting operation such as colloid milling sufficient to raise the temperature of the milled product by about 15° to 25° F.

The zeolite-clay-alumina slurry employing the dried pseudoboehmite according to our invention may be spray dried as herein described without milling the slurry prior to spray drying.

If the washed filter cake is to be dried before usage, we prefer that the drying be at temperatures not substantially above the boiling point of water, i.e., about 100° C. The filter cake may be sprayed dried in which case we prefer that the spray drier be operated so that the exit temperature of the gases be less than about 400° F.

The pseudoboehmites of our invention produce catalysts of the above type which have superior Attrition Resistance (AI less than twenty (20), and are catalytically active as is illustrated in Table 7.

Such catalysts include the zeolite type catalysts containing less than about 4.5% of sodium (expressed as the % equivalent $Na_2O$ on a volatile free basis) containing also monovalent cations, such as H, $NH_4$, alkyl ammonium ions and may also contain polyvalent cations, such as alkaline earth cations, the transition metals or rare earth cations or mixtures thereof. The zeolite is usually combined with a matrix including the pseudoboehmite of our invention and may also contain clay.

The zeolites of our preferred embodiment are the zeolites of the Y type (See Breck, supra) which have been exchanged with $NH_4$ or rare earth cations or both rare earth and ammonium ions to reduce the sodium content to less than 3.5% and preferably less than 2% expressed as the percent of the equivalent $Na_2O$. One type of such exchanged Y may be used or mixtures of differently exchanged Y may be used alone or admixed with other types of zeolites.

The aluminas of our invention may also be used with other catalytic solids, for example, other zeolites such as the X Type, mordenite, the zeolites formed employing organo ammonium hydroxides, for example, the so called ZSM and 2K zeolites to impart, for example, desirable catalytic activity or attrition resistance or other desirable properties.

The zeolite employed in our preferred catalyst may range from 10% to about 50% of the catalyst, alumina, from about 90% to about 50% of the catalyst. Preferably kaolin clay is used in the matrix from about 20% to about 85% of the catalyst and in such case, the alumina is used in the range of about 5% to about 35%, all based on the composite catalyst on a volatile free basis.

The pseudoboehmites of our invention are also useful as substrates for catalysts for which aluminas have been used in the prior art such as hydrodesulfurization catalysts.

We claim:

1. A process for producing crystalline pseudoboehmite having a peptization index or less than 60 which comprises reacting an aluminum sulfate with ammonium hydroxide in a water solution to a terminal pH of in excess of 9, and forming alumina hydrate gel in a mother liquor, aging said mixture of gel and mother liquor to convert said gel to crystalline pseudoboehmite and maintaining said mother liquor at a pH of about 8 or higher during said aging and separating mother liquor from the pseudoboehmite, in which said aging or said separation is under quiescent conditions.

2. A process for producing pseudoboehmite having a peptization index of less than 60 which comprises reacting a mixture of crystalline pseudoboehmite seed and aluminum sulfate with ammonium hydroxide in a water solution to a terminal pH of in excess of 9, and forming alumina hydrate gel in a mother liquor, aging said mixture of gel and mother liquor to convert said gel to crystalline pseudoboehmite and maintaining said mother liquor at a pH of about 8 or higher during aging and separating mother liquor from the pseudoboehmite, in which said aging or said separation is under quiescent conditions.

3. The process of claim 2, in which the quantity of the pseudoboehmite is equivalent to 0.05% to 1% by weight of the $Al_2O_3$ equivalent to the weight of aluminum sulfate on a volatile free basis.

4. The process of claim 2, in which the pseudoboehmite seed has a peptization index of less than 60.

5. The process of claim 2, in which the pseudoboehmite seed has a peptization index of less than 60, in which the aging is under quiescent conditions.

* * * * *